Feb. 19, 1957 P. E. HORD 2,781,717
WINDOW UNIT FOR USE WITH AIR CONDITIONERS
Filed May 26, 1954 2 Sheets-Sheet 1
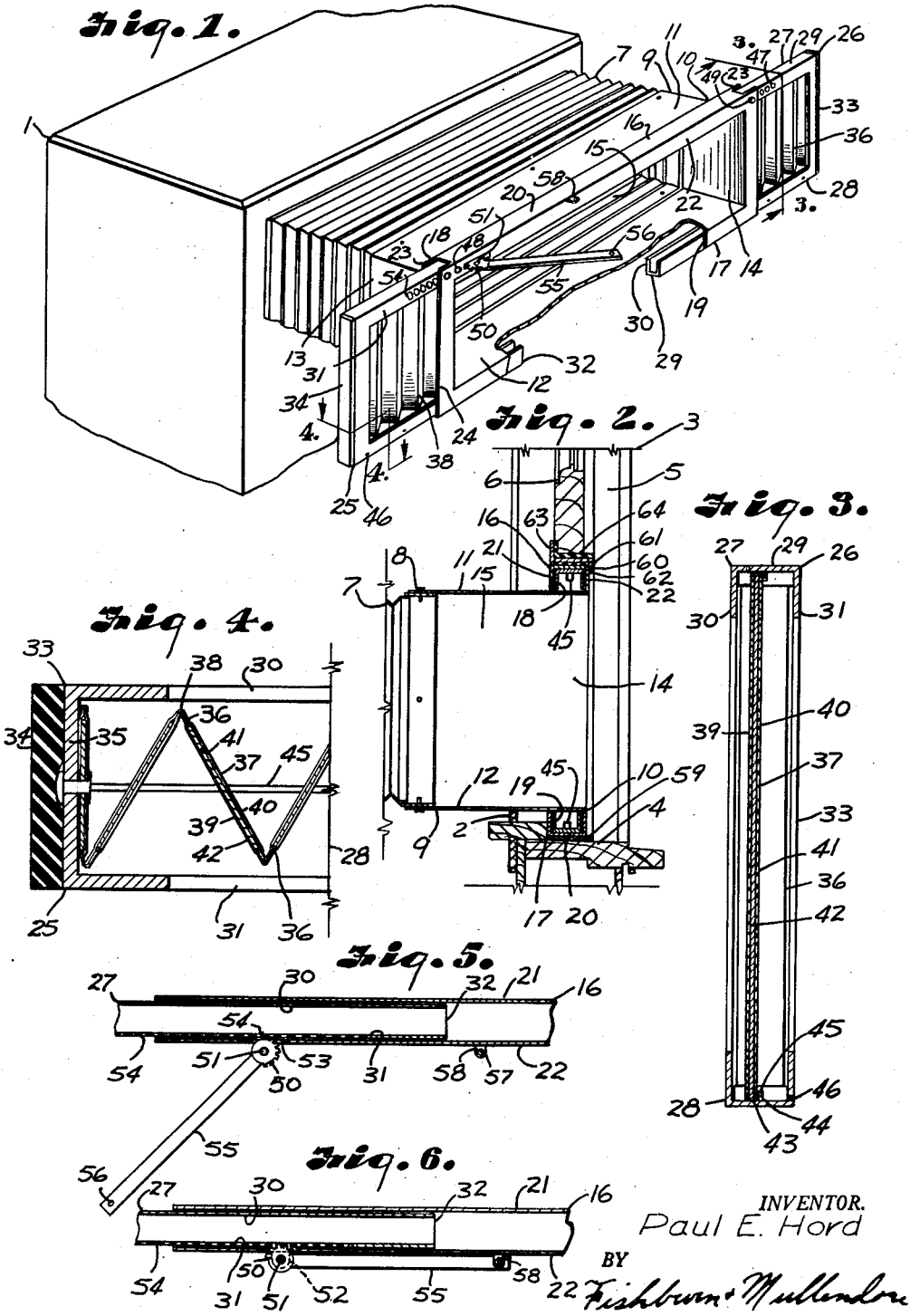
INVENTOR.
Paul E. Hord
BY
Fishburn & Mullendore
ATTORNEYS

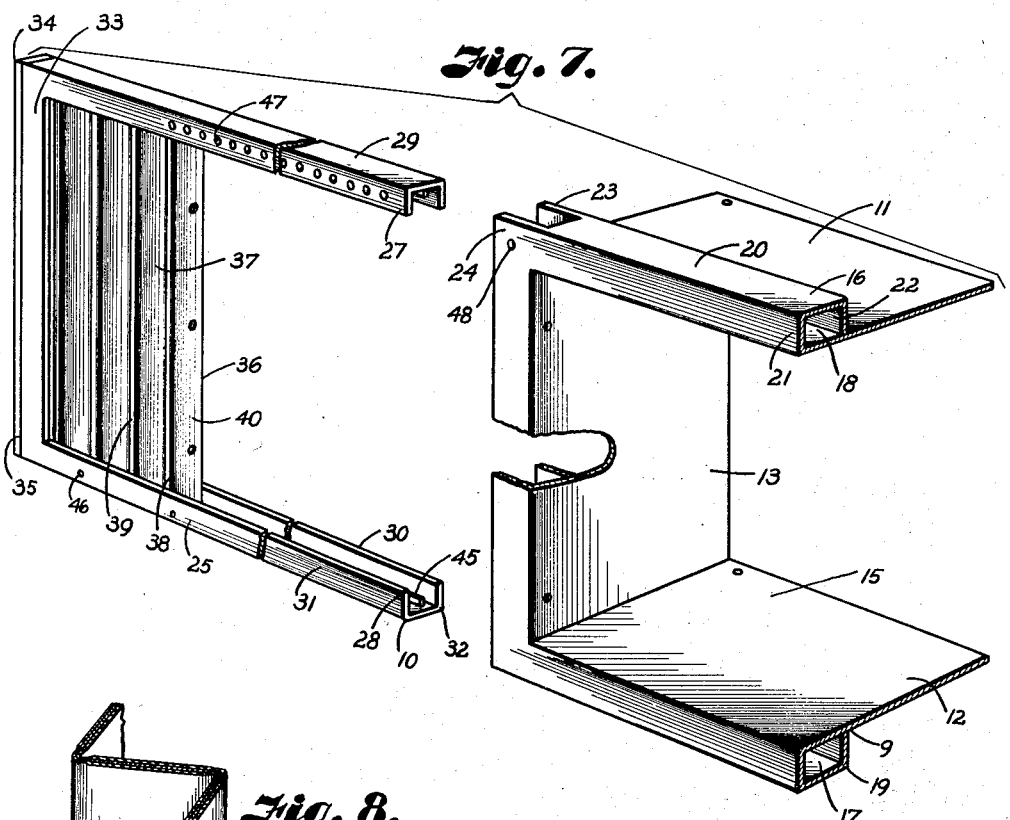
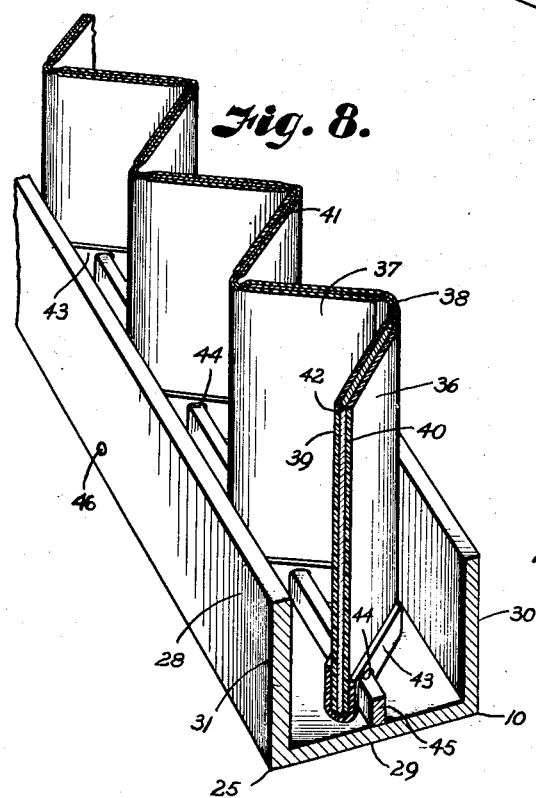
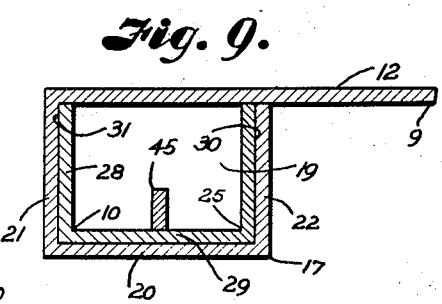

United States Patent Office 2,781,717
Patented Feb. 19, 1957

2,781,717
WINDOW UNIT FOR USE WITH AIR CONDITIONERS
Paul E. Hord, Tebbetts, Mo.
Application May 26, 1954, Serial No. 432,427
6 Claims. (Cl. 98—94)

This invention relates to window units for use with air conditioners such as the self-contained air-cooled refrigeration type, and more particularly to a structure for supporting an inlet and/or outlet connection of console type air conditioners in a window opening.

Air conditioners of the console type must have some means of cooling the compressor and other equipment usually mounted in a cabinet and those having water-cooled compressors require plumbing and are not movable to different portions of a room to be cooled. Air conditioners having air-cooled compressors and the like may be moved around as desired, except that it is necessary that they be positioned adjacent an opening or duct for passage of the compressor cooling air as well as for circulation of air into and out of the room to be cooled. However, it has usually been necessary to provide a fixed mounting in a window for connection with the air conditioner unit and the time and expense necessary for the moving of the window connection materially reduces the advantages of portability of the air conditioning unit. Also the movement of the air conditioning unit from adjacent one window to a position adjacent another window of a different size usually requires additional cutting of metal panels and strips, gaskets and the like to prevent air leakage around the window connection and such operations require an experienced service man.

The principal objects of the present invention are to provide a shell or housing having an air passage therein connected with a flexible duct on a console type air conditioner with adjustable side panels on the shell or housing for movement into contact with the faces of the window casing; to provide such a shell or housing and adjustable side panels adapted to fit windows of different width and clampingly engage the sides thereof to hold the shell or housing in place without auxiliary fastening devices; to provide such a shell or housing with a frame surrounding same and side panels telescopingly and slidably engaging said frame with an expansible member in each of the side panels to close the space between the shell or housing and the sides of the window frame; to provide cooperating structure in the side panels and frame for effecting movement of said panels with respect to the frame; to provide panel operating structures for forcing the side panels into engagement with the faces of the window frame with substantial pressure to effectively clamp the structure in the window frame in a manner that will prevent accidental dislodgment and also prevent vibration and noise from the operation of the air conditioning unit; to provide such a window unit with resilient gaskets and stripping whereby when mounted in a window opening it is substantially weathertight; and to provide a window unit of this character adapted to be used with console type air conditioners, which is economical to manufacture and is easily adjusted to various size window openings as it is installed therein, and is quickly and easily removed from one window to another of different size and yet be efficient and weathertight in operation.

In accomplishing these and other objects of the present invention I have provided improved details of structure, the preferred forms of which are illustrated in the accompanying drawings, wherein:

Fig. 1 is a perspective view of the window unit operatively connected with a flexible duct of a console type air conditioner.

Fig. 2 is a vertical sectional view through the window unit.

Fig. 3 is a vertical sectional view through a side panel on the line 3—3, Fig. 1.

Fig. 4 is a partial horizontal sectional view through the side panel on the line 4—4, Fig. 1.

Fig. 5 is a horizontal sectional view through the window unit with the side panel moving mechanism in position for moving the panel relative to the frame.

Fig. 6 is a similar sectional view with the panel moving member in locked position.

Fig. 7 is a disassembled perspective view of a portion of the shell and an extension frame and an extensible member, portions being broken away to illustrate the structure of the various parts.

Fig. 8 is an enlarged perspective view of a portion of the extensible member and extension frame leg, particularly illustrating the engagement of extensible member and rib in the leg.

Fig. 9 is an enlarged transverse sectional view through the trackway and extension frame leg.

Referring more in detail to the drawings:

1 designates the cabinet of a console type air conditioner having conventional air-cooled compressor and equipment therein and adapted to be arranged adjacent a window opening 2 of a window frame 3 having the usual sill 4, side faces 5 and lower sash 6. The air conditioner cabinet 1 has a flexible duct 7 for flow of air to and from the cabinet 1. The duct 7 is preferably of the bellows type to permit movement of the cabinet 1 both toward and away from the window and also some lateral movement. The end of the duct 7 remote from the cabinet 1 is secured in communicating relation as at 8 to a hollow shell or housing 9 that is supported in the window opening by an adjustable frame structure 10, as later described.

The hollow shell or housing 9 is preferably tubular and formed of sheet metal or the like to provide a top wall 11, bottom wall 12 and end walls 13 and 14 respectively defining a substantially rectangular passage 15 therethrough whereby the width of the shell is less than the minimum width of the window opening which will serve the air conditioner, and of suitable height to provide desired volumetric flow of air through the ducts that will still fit between the sill 4 and the lower sash 6 of the window.

Channel members 16 and 17 are mounted on the exterior of the top and bottom walls 11 and 12 respectively to cooperate with said walls in forming rectangular trackway housings having trackway openings 18 and 19 coextensive with the widh of the shell 9. In the illustrated structure each of the channel members 16 and 17 consists of a bar member 20 terminating at its side edges in spaced parallel flanges 21 and 22 and the free ends of each of the flanges are suitably secured to the respective walls 11 and 12 as by welding. The end walls 13 and 14 are provided with spaced parallel flanges 23 and 24 extending laterally thereof and substantially coplanar with the flanges 21 and 22 respectively, said flanges being suitably secured to the walls 13 and 14 as by welding. Obviously the shell 9, channels 16 and 17 and flanges 23 and 24 may be fabricated as desired to form a strong, rigid structure with parallel trackway openings arranged as described.

End extension panel assemblies 25 and 26 are slidably engaged with the shell and trackway housing structure and movable endwise relative thereto for engaging the side faces 5 of the window frame to retain the structure in the window opening. Each of the end panels consists of upper and lower guide members 27 and 28 respectively preferably consisting of channel members of suitable size to slide in the trackway openings 18 and 19 with the bar portion 29 of said channel members engaging the inner surfaces of the bar portions 20 of the channel members 16 and 17 and the outer surfaces of the leg portions 30 and 31 of said channel guide members 27 and 28 engaging the inner surfaces of the flanges 21 and 22 of said channel members 16 and 17. The free ends 32 of the legs 30 and 31 preferably engage the outer surface of the shell walls that form the inner walls of the trackway openings 18 and 19 whereby the sliding engagement of the guide members 27 and 28 with the walls of the trackway openings 18 and 19 is such that the end panels may be moved endwise relative to the shell and trackway housing with substantially no binding and with little lateral play. The outer ends of the guide members 27 and 28 are suitably secured as by welding to vertical channel-shaped members 33, the legs of which are directed toward the shell and trackway housing. A sponge rubber or other suitable gasket 34 is preferably suitably secured to the outer surface of the bar 35 which connects the legs of the vertical channel members 33 to form a resilient seal between the end panels 25 and 26 and the side faces 5 of the window frame. The width of the channels 33 is preferably the same as the width of the guide members 27 and 28 whereby the end panels may be moved toward the shell and trackway housing assembly until the channels 33 enter between the flanges 23 and 24 to present a minimum width for the entire structure.

Suitable extensible members 36 are arranged in the end panels 25 and 26 in such a manner as to close variable sized openings defined by the flanges 24, end panel guide members 27 and 28 and vertical member 33. In the illustrated structure each of the extensible members 36 comprises a plurality of vertical panels 37 hingedly connected as at 38 with one of the panels being suitably secured to the bar portion 35 of the vertical channels 33 of the end panels and another panel 37 at the other end of the extensible member suitably secured to the shell 9 between the flanges 23 and 24. The extensible members preferably consist of two sheets 39 and 40 of waterproof fabric, synthetic resin or other flexible material sewed or otherwise suitably secured together at the hinge connections 38 to form pockets 41 between the hinge connections. Strips 42 of metal or other suitable, relatively rigid material are arranged in the pockets 41 to stiffen the respective panels 37 of the extensible member. The upper and lower edges of the panels 37 are preferably provided with a rubber or other resilient strip 43 to resiliently and seatingly engage the bars 29 of the guide members 27 and 28. Also the panel members 37 are preferably provided with slots 44 in the upper and lower edges to engage over guide ribs 45 arranged centrally of and extending vertically relative to the bar members 29. The slots 44 and guide ribs 45 cooperate in maintaining the panels 37 in adjusted position and prevent movement thereof from wind and the like.

While the extensible member is illustrated for cooperation with the ribs 45 to maintain the panels thereof whereby they extend across the guide members 27 and 28 of the end panels, the ribs 45 can be omitted and the respective panels 37 flattened against the inner surface of the legs 31. With such an arrangement, sponge rubber or the like can be inserted in the channels 27 and 28 to retain the panels 37 in weathertight sealing engagement with the legs 31.

It is preferable that weep holes 46 be arranged at the bottom of the legs 31 of the guide members 28 in the end panels whereby rain or moisture collecting in the channels exteriorly of the extensible member 36 can drain to the outside of the window. The end panel members are movable relative to the shell and trackway housing assembly to provide extensions that can be positively engaged with the side faces 5 of the window frame with sufficient pressure to retain the entire structure in the window frame without auxiliary fastening devices. Both of the end panels may be moved outwardly by mechanical means, however, in the illustrated structure the leg 31 of the guide member 27 in the end panel 26 is provided with a plurality of spaced apertures 47 arranged along the length of said guide member. Said apertures 47 are adapted to be aligned with an aperture 48 in the upper portion of the flange 24 whereby a screw or other suitable fastening device 49 may be inserted in the aligned apertures 47 and 48 to secure the end panel 26 in selected adjusted position.

At the other end of the trackway housing channel member 16 a gear segment 50 is rotatably mounted on a pin 51 carried by suitable ears or the like 52 whereby the gear segment extends through a slot 53 in the respective trackway housing and the gear teeth engage in spaced apertures 54 in the adjacent guide member of the respective end panel 25. A lever 55 is fixed to the gear segment which, in the illustrated structure, has teeth extending through substantially one-half of the circle. With this arrangement when the lever 55 is moved to position the teeth of the gear segment exteriorly of the trackway housing or otherwise disengaged from the openings 54 the end panel 25 can be moved manually to approximately the desired position. Then by swinging the lever 55 away from the end panel the gear teeth are engaged with the openings 54 and movement of the lever turns the gear segment and forces the end panel 25 outwardly from the trackway housing. It is preferable that the lever be swung to a position alongside of the upper trackway housing or channel 16 whereby an aperture 56 in said lever aligns with an aperture 57 in an ear 58 fixed to the channel 16, and then a bolt or other suitable fastening device 59 may be inserted through the apertures 56 and 57 to hold the lever in place and prevent retraction of the respective end panels.

In installing the window unit constructed and assembled as described, the lower sash 6 is raised above the height required for the window unit. Then a strip of felt, rubber or other suitable sealing material 59 is laid on the window sill completely across the window opening under the normal position of the lower sash 6. The lever 55 is swung to disengage the teeth of the gear segment 50 from the openings 54 and the fastening device 49 removed, whereby the end panels may be slid manually toward the shell and trackway housing assembly to provide an over-all width that is less than the width of the window opening. Then the unit is positioned in the window opening as illustrated in Fig. 2 with the lower channel or trackway housing 17 resting on the sealing strip 59. The shell is positioned laterally in the window as desired and then the end panel 26 is moved outwardly to engage the resilient strip 34 on the end thereof with the side face 5 of the window frame. The closest aperture 47 in the guide member 27 is then aligned with the aperture 48 and the fastening device 49 is inserted to hold the end panel 26 in selected position. During the movement of the end panel the extensible member 36 therein always closes the opening through the end panel. The end panel 25 is then moved whereby the resilient member 34 on the end thereof approaches the adjacent side face 5 of the window frame leaving slightly less space than the movement that may be effected by swinging the lever 55 and rotating the gear segment 50. Then said handle is swung away from the end panel to move the teeth of the gear segment into engagement with the openings 54 to forcibly move the end panel 25 outwardly whereby the resilient seal member 34 on the end of said end panel engages the adjacent side face 5 of the window frame.

It is desirable that there be some additional movement necessary to move the lever 55 alongside of the trackway housing 16 to further move the end panel 25 outwardly under substantial pressure which compresses both of the resilient members 34 on each end panel and tightly secures the entire assembly in the window frame whereby the window unit is in substantially rigid relation with said window frame. During this further movement the lever 55 should be moved alongside of the trackway housing to align the opening 56 with the opening 57 whereby a fastening device can be inserted therethrough to secure the lever in position wherein the gear segment teeth still are engaged with the end panel to positively retain the pressure of the end panels against the window frame and prevent any dislodgment thereof. A rubber or other suitable strip 60 is arranged along the top of the channel 16 and the end panels for the full width of the window opening. Then a Z-shaped, preferably metal, strip 61 is arranged on the sealing strip 60 with a depending flange 62 extending downwardly on the outside of the channel 16 and upper members of the end panels and an upwardly extending flange 63 approximately at the inner side of the channel 16. The strip may be of two pieces with overlapped ends if desired. A sealing strip 64 of rubber or other suitable material is placed on the Z bar and then the lower sash 6 lowered into engagement with said sealing strip 64. This arrangement provides the weather seal around the entire unit to prevent movement of air, moisture or the like from entering the room around the window unit or through the end panels.

When it is desired to remove the window unit from the window opening the lower sash is raised, the strips 60 and 64, together with the Z bar 61, are removed, the fastening device is removed and the lever 55 swung outwardly to move the end panel 25 toward the shell and trackway housing assembly. During such movement the extensible member 36 collapses and the end panel can be moved whereby the vertical member 33 thereof moves between the flanges 23 and 24. Then the entire unit can be lifted from the window opening. The fastening device 49 can be removed and the end panel 26 moved toward the shell and trackway assembly, collapsing the extensible member in said end panel.

It is believed obvious I have provided a window unit for use with air conditioners that is economical to manufacture and easily installed in window openings to positively hold the window unit in position without auxiliary fastening devices.

What I claim and desire to secure by Letters Patent is:

1. A window unit for use with an air conditioner wherein the unit is mounted in a window opening on a window ledge beneath the lower sash of a vertically movable window comprising, a hollow substantially rectangular shell having a width less than the width of the window opening, channel-shaped members mounted on the upper and lower portions of the shell and extending across the width thereof and cooperating with the shell to define upper and lower trackways, said channel on the lower portion of the shell being adapted to rest on a window ledge below the lower sash of a vertically movable window with the channel on the upper portion below said lower sash, U-shaped extension frames having a vertical member connected to parallel legs arranged at the ends of the shell with the legs slidable in the trackways for movement of the extension frames toward and away from the shell, an extensible member in each of the extension frames and having end portions secured to the shell and to the vertical member of the extension frames remotely of the shell respectively, said extensible members having a plurality of vertical folds therein defining a plurality of vertically extending panel portions, each of said panel portions being so formed at its edges as to embrace with the edges of the adjoining panel portions, vertically extending strips in the panel portions providing vertical rigidity to the panel portions, means forming a weathertight engagement of the extensible members and the legs of the extension frames, means engaging the trackways and an extension frame for locking said frame in selected extended relation relative to the shell, gear means rotatably mounted in fixed relation to the shell adjacent the other extension frame, said other extension frame having a series of tooth engaging portions in operative engagement with said gear means whereby rotation of the gear means moves said other extension frame relative to the shell, means for rotating said gear means and applying force thereto to move the extension frames into tight engagement with the sides of the window opening to hold the frames and shell in the window opening without auxiliary fastening devices, and means for locking said gear means to hold same against rotation whereby the extension frames are retained in window frame engaging position.

2. A window unit for use with an air conditioner wherein the unit is mounted in a window opening on a window ledge beneath the lower sash of a vertically movable window comprising, a hollow substantially rectangular shell having a width less than the width of the window opening, channel-shaped members mounted on the upper and lower portions of the shell and extending across the width thereof and cooperating with the shell to define upper and lower trackways, said channel on the lower portion of the shell being adapted to rest on a window ledge below the lower sash of a vertically movable window with the channel on the upper portion below said lower sash, U-shaped extension frames having a vertical member connected to parallel legs arranged at the ends of the shell with the legs slidable in the trackways for movement of the extension frames toward and away from the shell, an extensible member in each of the extension frames and having end portions secured to the shell and to the vertical member of the extension frames remotely of the shell respectively, said extensible members having a plurality of vertical folds therein defining a plurality of vertically extending panel portions, each of said panel portions being so formed at its edges as to embrace with the edges of the adjoining panel portions, vertically extending strips in the panel portions providing vertical rigidity to the panel portions, means forming a weathertight engagement of the extensible members and the legs of the extension frames, resilient sealing strips along the window frame ledge and sash engaging portions of the extension frames and channels, a Z-shaped member extending along the upper channel and extension frames and having a depending flange exteriorly thereof and an upstanding flange interiorly of the lower sash for cooperation with the sealing strips in making a weathertight mounting in the window opening, means engaging the trackways and an extension frame for locking said frame in selected extended relation relative to the shell, one of the legs of the other extension frame having a series of serrations forming tooth engaging portions, gear means rotatably mounted in fixed relation to the shell adjacent the leg of said other extension frame having the tooth engaging portions, said gear means having teeth in operative engagement with the tooth engaging portions in said one leg of said other extension frame whereby rotation of the gear moves said other extension frame relative to the shell, means for rotating said gear means applying force thereto to move the extension frames into tight engagement with the sides of the window opening to hold the frames and shell in the window opening without auxiliary fastening devices, and means for locking said gear means to hold same against rotation whereby the extension frames are retained in window frame engaging position.

3. A window unit for use with an air conditioner wherein the unit is mounted in a window opening on a window ledge beneath the lower sash of a vertically movable window comprising, a hollow substantially rectangular shell of a width less than the width of the window opening and having trackway housings on the upper and lower portions of the shell, said trackway housing on the lower portion of the shell being adapted to rest on a window ledge below the lower sash of a vertically movable window with the trackway housing on the upper portion below said lower sash, U-shaped extension frames arranged at the ends of the shell and having a vertical member connected to parallel legs with said legs movable in the trackways for movement of the extension frames toward and away from the shell, said parallel legs having inwardly facing channels therein, an extensible member in each of the extension frames and having end portions secured to the shell and to the extension frames remotely of the shell respectively, said extensible members having a plurality of vertical folds therein defining a plurality of vertically extending panel portions, hinge means connecting adjacent edges of adjacent panel portions to form a hinged connection therefor, vertically extending strips in the panel portions providing vertical rigidity to said panel portions, said panel portions extending into the channels of the legs of the extension frames, resilient means in the channels of the legs of the extension frames and engaging the panel portions extending into the channels to form a weathertight seal between the panel portions and legs, cooperative means in the channels of the legs of the extension frames and the panel portions extending therein retaining said panel portions against relative hinging movement when the extension frames are in selected extended position, and means fixed relative to the shell and having operative engagement with an extension frame for moving said frame into tight engagement with the sides of the window opening and holding the frame and shell in the window opening without auxiliary fastening devices.

4. A window unit for use with an air conditioner wherein the unit is mounted in a window opening on a window ledge beneath the lower sash of a vertically movable window comprising, a hollow substantially rectangular shell having a width less than the width of the window opening, channel-shaped members mounted on the upper and lower portions of the shell and extending across the width thereof and cooperating with the shell to define upper and lower trackways, said channel on the lower portion of the shell being adapted to rest on a window ledge below the lower sash of a vertically movable window with the channel on the upper portion below said lower sash, U-shaped extension frames having a vertical member connected to parallel legs arranged at the ends of the shell with the legs slidable in the trackways for movement of the extension frames toward and away from the shell, an extensible panel member in each of the extension frames and having end portions secured to the shell and to the vertical member of the extension frames remotely of the shell respectively, said extensible panel members having a plurality of vertical folds therein defining a plurality of vertically extending panel portions, hinge means connecting adjacent edges of adjacent panel portions to form a hinged connection therefor, means in the panel portions providing vertical rigidity thereto, said panel portions extending into the channels of the legs of the extension frames, resilient means engaging the panel portions and legs of the extension frames to form a substantially weathertight seal therebetween, means rotatably mounted in fixed relation to the shell adjacent an extension frame, said means having operative engagement with said extension frame for moving said extension frame relative to the shell and into tight engagement with the sides of the window opening to hold the frames and shell in the window opening without auxiliary fastening devices, cooperative means in the channels of the legs of the extension frames and the panel portions extending therein retaining said panel portions against relative hinging movement when the extension frames are in selected extended position, and means for locking said extension frames to hold same against movement relative to the shell whereby the extension frames are retained in window frame engaging position.

5. A window unit for use with an air conditioner wherein the unit is mounted in a window opening comprising, a hollow substantially rectangular shell of a width less than the width of the window opening and having trackway housings on the upper and lower portions of the shell and extending across the width thereof, U-shaped extension frames having a vertical member connected to parallel legs arranged at the ends of the shell with the legs slidable in the trackway housings for movement of the extension frames toward and away from the shell, said legs having inwardly facing channels therein, an extensible panel member in each of the extension frames and having end portions secured to the shell and to the vertical member of the extension frames remotely of the shell respectively, said extensible panel members having a plurality of vertical folds therein defining a plurality of vertically extending panel portions, hinge means connecting adjacent edges of adjacent panel portions to form a hinged connection therefor, means in the panel portions providing vertical rigidity thereto, said panel portions extending into the channels of the legs of the extension frames, cooperative means in the channels of the legs of the extension frames and the panel portions extending therein retaining said panel portions against relative hinging movement when the extension frames are in selected extended position, and resilient means engaging the panel portions and legs of the extension frames to form a substantially weathertight seal therebetween.

6. A window unit for use with an air conditioner wherein the unit is mounted in a window opening comprising, a hollow substantially rectangular shell of a width less than the width of the window opening and having trackway housings on the upper and lower portions of the shell and extending across the width thereof, U-shaped extension frames having a vertical member connected to parallel legs arranged at the ends of the shell with the legs slidable in the trackway housings for movement of the extension frames toward and away from the shell, said legs having inwardly facing channels therein, an extensible panel member in each of the extension frames and having end portions secured to the shell and to the vertical member of the extension frames remotely of the shell respectively, said extensible panel members having a plurality of vertical folds therein defining a plurality of vertically extending panel portions with each panel portion at an angle to the adjacent panel portion, hinge means connecting adjacent edges of adjacent panel portions to form a hinged connection therefor whereby extension of the extensible panel members increases the angle between adjacent panel portions, means in the panel portions providing vertical rigidity thereto, said panel portions extending into the channels in the legs of the extension frames, resilient means in the channels of the legs of the extension frames and engaging the panel portions extending into said channels to form a substantially weathertight seal between the panel portions and said legs, means for locking the extension frames against movement relative to the shell and in window frame engaging position, and cooperative means in the channels of the legs of the extension frames and the panel portions extending therein retaining said panel portions in selected angular relation when said extension frames are locked against movement relative to the shell.

References Cited in the file of this patent
UNITED STATES PATENTS

| | | |
|---|---|---|
| 2,052,453 | Dollinger | Aug. 25, 1936 |
| 2,279,271 | Williams | Apr. 7, 1942 |
| 2,296,635 | Foehrenbach et al. | Sept. 22, 1942 |
| 2,433,104 | Eberhart | Dec. 23, 1947 |
| 2,448,671 | Hord | Sept. 7, 1948 |
| 2,487,294 | Belter | Nov. 8, 1949 |
| 2,577,845 | Delf et al. | Dec. 11, 1951 |
| 2,617,348 | Sutton | Nov. 11, 1952 |
| 2,620,638 | Grandinetti | Dec. 9, 1952 |